July 12, 1927.                    1,635,435
E. N. RICHARDSON
MARKING MECHANISM FOR PLANTERS
Filed May 14, 1926          2 Sheets-Sheet 1
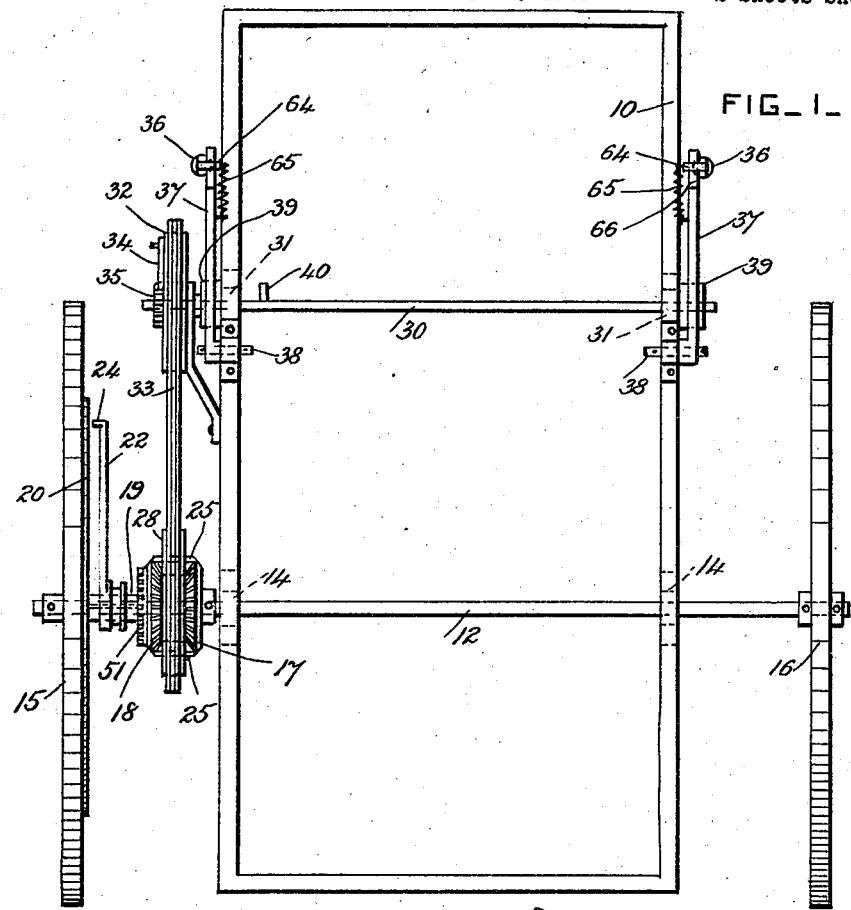
FIG_1_
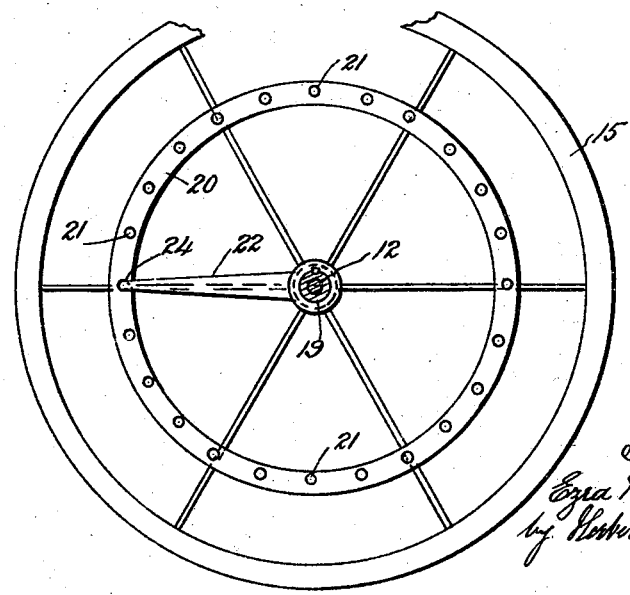
FIG_2_
Inventor
Ezra N. Richardson
by Herbert W. Jenner
Attorney July 12, 1927.  
E. N. RICHARDSON  
1,635,435  
MARKING MECHANISM FOR PLANTERS  
Filed May 14, 1926   2 Sheets-Sheet 2
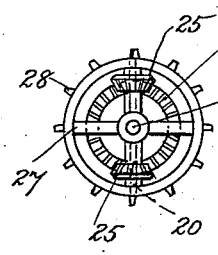
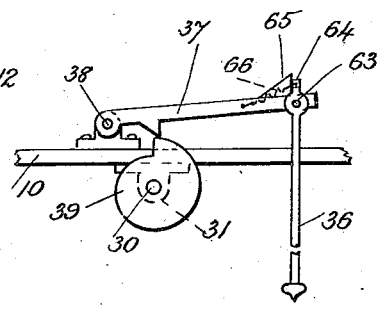
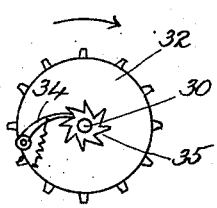
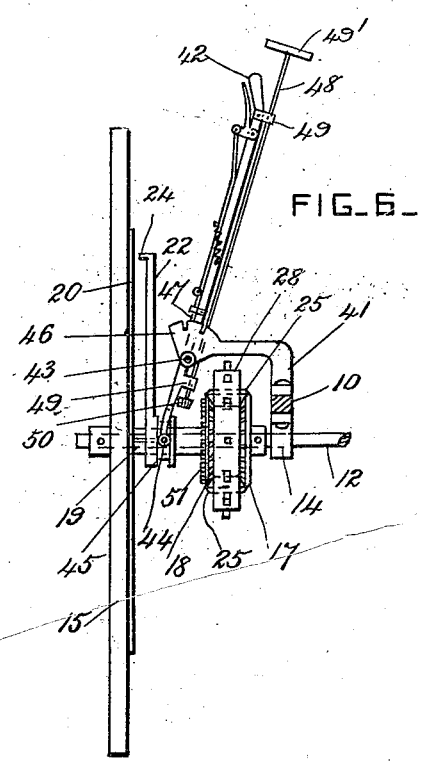
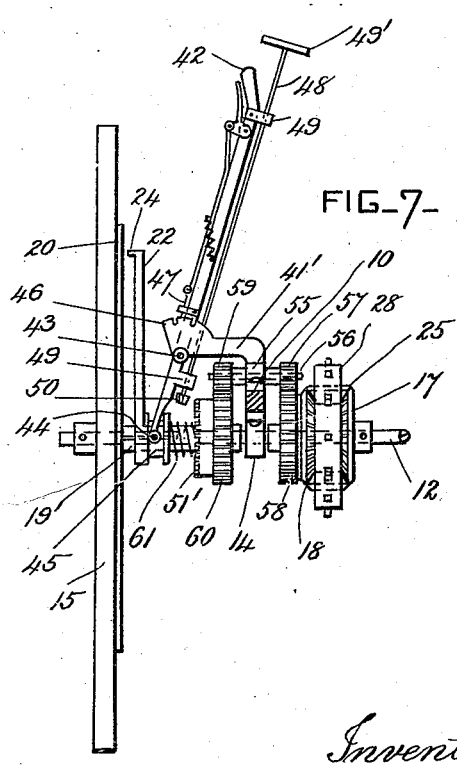

Patented July 12, 1927.

1,635,435

UNITED STATES PATENT OFFICE.

EZRA N. RICHARDSON, OF DETROIT, MICHIGAN.

MARKING MECHANISM FOR PLANTERS.

Application filed May 14, 1926. Serial No. 109,103.

This invention relates to ground marking mechanism used on corn planters or other similar machines; and it consists in the novel construction and combination of the parts hereinafter fully described and claimed whereby rough and uneven ground can be marked with regularity and to better advantage for planting the seed, and upon curved lines.

In the drawings, Figure 1 is a plan view of the frame of a corn planter provided with marking mechanism according to this invention, and with the setting devices for the marking mechanism omitted, for clearness. Fig. 2 is a side view of one ground wheel and the clutch arm, showing the axle in section. Fig. 3 is a side view of a portion of the differential gearing. Fig. 4 is a side view of one ground marker with its lever and cam. Fig. 5 is a side view of the ratchet mechanism on the cam shaft. Fig. 6 is a front view of the setting mechanism including one ground wheel and the differential gearing shown in Fig. 1. Fig. 7 is a side view similar to Fig. 6 but shows the setting devices arranged outside the frame and the construction modified accordingly.

The planting mechanism is not shown, as it is of any approved construction. The frame 10 of the machine is provided with an axle 12, which revolves in bearings 14 on the frame. One ground wheel 16 is secured on one end portion of the axle, and the other ground wheel 15 is mounted loosely on the other end portion. The differential gearing has one toothed wheel 17 secured on the axle 12, and the other similar wheel 18 mounted loosely on the axle.

In the form of the machine shown in Figs. 1 and 6, the wheel 18 is secured on a sleeve 19, and this sleeve is revolved by the ground wheel 15. The ground wheel 15 has a clutch ring 20 secured to it and provided with holes 21. The sleeve 19 has a clutch arm 22 splined on it and provided at its free end with a tooth 24 for engaging with any one of the holes in the clutch ring. The arm is adjusted circumferentially, and is placed in engagement with the clutch ring, by setting devices which will be fully described hereinafter.

The toothed wheels 17 and 18 of the differential gearing mesh into toothed pinions 25 which run loose on pins 26 arranged radially of the axle in a frame 27, and a sprocket wheel 28 is formed on or secured to the frame 27 concentric with the axle. A cam shaft 30 is journaled in bearings 31 on the frame, and a sprocket wheel 32 is journaled loosely on one end portion of the cam shaft 30. The two sprocket wheels 28 and 32 are operatively connected by a drive chain 33. The sprocket wheel 32 is provided with a spring-actuated pawl 34, which engages with a ratchet-toothed wheel 35 secured on the cam shaft 30, so that the cam shaft is revolved continuously as the machine is moved along in one direction, and is not revolved when the machine is moved in the reverse direction.

The ground markers 36 are arranged vertically, and are pivotally connected to the free end portions of the marker levers 37 which are pivoted to the frame by pins 38, and arranged one at each side thereof over the respective cams 39 which are secured on the cam shaft.

The markers are raised and dropped by the cams, so as to mark the ground as the machine is drawn along, and the differential gearing enables the machine to move upon curves and over uneven ground, and to mark the ground to good advantage. The cam shaft 30 is provided with a projection 40 for operating the planting mechanism, but that mechanism can be operated by any other approved means. The setting mechanism shown in Fig. 6 is preferably used. A supporting bracket 41 is secured to the frame, and a setting lever 42 is pivoted to this bracket by a pin 43. The lever 42 has a projection or fork 44 at its lower end which engages with the flanges of a collar 45 secured to the clutch arm 22 and splined with it on the sleeve 19. The bracket 41 is provided with a notched quadrant 46, and the lever 42 is provided with a slidable catch 47 for engaging with the notched quadrant, and holding the clutch arm either in or out of engagement with the clutch ring.

The lever 42 carries a setting shaft 48 journaled in bearings 49 which project from it, and the shaft 48 has a hand wheel 49' for revolving it. A small toothed wheel 50 is secured on the lower end portion of the shaft 48, and meshes into a toothed ring 51 on the differential gear wheel 18 when the clutch arm has been moved by the lever 42 out of engagement with the clutch ring, and has been slid far enough. The clutch arm can then be revolved to adjust it, by turning the hand wheel, and can be slid back into engagement with the clutch ring in any position which may for the time being be necessary or desirable.

In the form of the setting devices shown in Fig. 7, the setting devices are arranged outside the frame 10, and the bracket 41' is provided with a bearing 55. A countershaft 56 is journaled in the bearing 55, and has toothed pinions 57 and 59 secured on its opposite end portions. A toothed wheel 58 is secured to the differential gear wheel 18 and meshes with the wheel 57, and a toothed wheel 60 is secured on the sleeve 19' and meshes into the wheel 59. A helical spring 61 is interposed between the wheel 60 and the collar 45 to press the clutch arm towards the clutch ring, and the wheel 60 is provided with a toothed ring 51' similar to the toothed ring 51 hereinbefore described. When the toothed pinion 50 is slid into mesh with the toothed ring 51', the clutch arm can be set by means of the hand wheel and setting lever as hereinbefore described, as the toothed ring 51' is connected with the differential toothed wheel 18 by the countershaft and its gearing.

Each marker 36 is preferably pivoted to the marker lever 37 by a pin 63, and has a lug 64 at its top which overlaps the marker lever and is drawn against a lug 65 on the top of the marker lever by a spring 66. This spring holds the marker in proper position until the marker strikes a stone or stump, and then permits it to move pivotally to a limited extent.

What I claim is:

1. In a marking mechanism, a frame, ground wheels supporting the frame, a differential gearing operatively connected with the two ground wheels, a cam shaft journaled in the frame, cams secured on the end portions of the cam shaft, means for driving the cam shaft from the differential gearing, marker levers pivoted to the frame at one end and bearing on the said cams between their ends and oscillated by the cams, and ground markers arranged vertically and pivoted at their upper ends to the marker levers and reciprocated by them and the cams.

2. A marking mechanism as set forth in claim 1, each marker lever having a lug on its upper side, each ground marker having a lug which overlaps the marker lever, and springs normally holding the said lugs in engagement with each other and permitting the ground markers to move pivotally in one direction to a limited extent.

In testimony whereof I have affixed my signature.

EZRA N. RICHARDSON.